US012137480B2

(12) United States Patent
Chande et al.

(10) Patent No.: US 12,137,480 B2
(45) Date of Patent: **\*Nov. 5, 2024**

(54) METHODS AND DEVICES FOR FACILITATING RANDOM ACCESS COMMUNICATIONS IN WIRELESS COMMUNICATION SYSTEMS

(71) Applicant: QUALCOMM Incorporated, San Diego, CA (US)

(72) Inventors: Vinay Chande, San Diego, CA (US); Arumugam Chendamarai Kannan, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,421

(22) Filed: May 27, 2022

(65) Prior Publication Data

US 2022/0312494 A1 Sep. 29, 2022

Related U.S. Application Data

(63) Continuation of application No. 16/399,685, filed on Apr. 30, 2019, now Pat. No. 11,350,459.

(51) Int. Cl.
*H04W 74/08* (2009.01)
*H04W 16/28* (2009.01)
(Continued)

(52) U.S. Cl.
CPC ....... *H04W 74/0833* (2013.01); *H04W 16/28* (2013.01); *H04W 74/004* (2013.01)

(58) Field of Classification Search
CPC . H04W 24/02; H04W 72/0413; H04W 24/10; H04W 72/0453; H04W 72/1294;
(Continued)

(56) References Cited

U.S. PATENT DOCUMENTS 11,350,459 B2    5/2022  Chande
2016/0366675 A1  12/2016 Dinan
(Continued)

FOREIGN PATENT DOCUMENTS

CN    109152081 A    1/2019
CN    109275187 A    1/2019
(Continued)

OTHER PUBLICATIONS

Ericsson: "Beamforming Impact on Random Access", 3GPP Draft, 3GPP TSG-RAN WG2 #98, R2-1704099—Beamforming Impact on Random Access, 3rd Generation Partnership Project (3GPP), Mobile Competence Centre; 650, Route Des Lucioles; F-06921, Sophia-Antipolis Cedex; France, vol. RAN WG2, No. Hangzhou; May 15, 2017-May 19, 2017, May 14, 2017, XP051274707, 4 pages, Retrieved from the Internet: URL: http://www.3gpp.org/ftp/Meetings_3GPP_SYNC/RAN2/Docs/ [retrieved on May 14, 2017].
(Continued)

*Primary Examiner* — Jung Liu
(74) *Attorney, Agent, or Firm* — Paul M. McAdams; Shumaker & Sieffert, PA

(57) ABSTRACT

Aspects directed towards communications for random access procedures are disclosed. In one example, a first beam and a second beam may be available for communications between a scheduled entity and a scheduling entity. The scheduling entity may send, and the scheduled entity may receive, a message 1 transmission for a random access procedure on the first beam. The scheduled entity may open a random access response (RAR) window to monitor for a
(Continued)

message 2 transmission according to a predetermined sequence designating whether to monitor the first beam, the second beam, or some combination thereof. The scheduling entity may send, and the scheduled entity may receive, the message 2 transmission on the first beam or the second beam as designated by the predetermined sequence. Other aspects, embodiments, and features are also included.

22 Claims, 9 Drawing Sheets

(51) Int. Cl.
  *H04W 74/00* (2009.01)
  *H04W 74/0833* (2024.01)
(58) Field of Classification Search
  CPC . H04W 74/0833; H04W 24/08; H04W 80/02; H04W 16/14; H04W 74/0808; H04B 7/0626; H04L 5/001; H04L 5/0057
  See application file for complete search history.

(56) References Cited

U.S. PATENT DOCUMENTS

| | | | |
|---|---|---|---|
| 2017/0359114 A1 | 12/2017 | Akkarakaran et al. | |
| 2018/0242367 A1 | 8/2018 | Kim et al. | |
| 2019/0141546 A1 | 5/2019 | Zhou et al. | |
| 2019/0141742 A1* | 5/2019 | Zhou | H04L 5/0064 |
| 2019/0335513 A1 | 10/2019 | Dinan | |
| 2020/0077446 A1 | 3/2020 | Agiwal | |
| 2020/0275479 A1* | 8/2020 | Peisa | H04W 74/0833 |
| 2020/0288482 A1* | 9/2020 | Yl | H04W 72/20 |
| 2020/0288503 A1* | 9/2020 | Sahlin | H04L 5/0053 |

FOREIGN PATENT DOCUMENTS

| | | |
|---|---|---|
| CN | 109997405 A | 7/2019 |
| EP | 3657695 A1 | 5/2020 |
| WO | WO-2017213797 | 12/2017 |
| WO | 2019029676 A1 | 2/2019 |

OTHER PUBLICATIONS

International Search Report and Written Opinion—PCT/US2020/023147—ISA/EPO—dated Jun. 18, 2020.
Qualcomm Incorporated: "Remaining Details on RACH Procedure", 3GPP Draft, 3GPP TSG-RAN WG1 Meeting RAN1 92, R1-1802814, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Feb. 17, 2018, XP051398226, 13 pages. Retrieved from the Internet: URL: http://www.3gpp.org/ftp/tsg%5Fran/WG1%5FRL1/TSGR1%5F92/Docs/ [retrieved on Feb. 17, 2018].
Mediatek Inc: "Discussion on Random Access Procedure in NR",3GPP Draft, 3GPP TSG RAN WG1 Meeting #89,R1-1707841, Discussion on Random Access Procedure in NR Final, 3rd Generation Partnership Project (3GPP), Mobile Competence Centre, 650, Route Des Lucioles, F-06921, Sophia-Antipolis Cedex, France, vol. RAN WG1, no. Hangzhou; May 15-19, 2017, May 14, 2017 (May 14, 2017), XP051273042.

* cited by examiner

METHODS AND DEVICES FOR FACILITATING RANDOM ACCESS COMMUNICATIONS IN WIRELESS COMMUNICATION SYSTEMS

CROSS-REFERENCE TO RELATED APPLICATION

This application for patent is a continuation of co-pending U.S. patent application Ser. No. 16/399,685, filed on Apr. 30, 2019, assigned to the assignee hereof and hereby incorporated herein by reference in its entirety as if fully set forth below and for all applicable purposes.

TECHNICAL FIELD

The technology discussed below relates generally to wireless communication systems, and more particularly, to aspects of random access procedures in wireless communication systems.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate communications for random access procedures in wireless communication systems. According to at least one aspect of the disclosure, scheduled entities are disclosed. In at least one example, scheduled entities may include a transceiver, a memory, and a processor coupled to the transceiver and the memory. The processor may be adapted to determine a first beam and a second beam available for transmissions between the scheduled entity and a scheduling entity. The processor may further be adapted to send via the transceiver a message 1 transmission for a random access procedure on the first beam, where the message 1 transmission includes a physical random access channel (PRACH) preamble sequence. The processor may further be adapted to open a random access response (RAR) window to monitor for a message 2 transmission according to a predetermined sequence, where the predetermined sequence defines whether to monitor the first beam, the second beam, or some combination of the two beams. The processor may further be adapted to receive via the transceiver the message 2 transmission.

Additional aspects of the present disclosure include methods operational on a wireless communication device and/or means for performing such methods. According to at least one example, such methods may include determining a first beam and a second beam available for transmissions between the scheduled entity and a scheduling entity. A message 1 transmission for a random access procedure may be sent on the first beam. The message 1 transmission may include a PRACH preamble sequence. A RAR window may be opened to monitor for a message 2 transmission according to a predetermined sequence, where the predetermined sequence designates whether to monitor the first beam, the second beam, or some combination thereof. Furthermore, the message 2 transmission may be received.

Still further aspects of the present disclosure include processor-readable storage mediums storing processor-executable programming. In at least one example, the processor-executable programming may be adapted to cause a processor to determine a first beam and a second beam available for transmissions between the scheduled entity and a scheduling entity. The processor-executable programming may be further adapted to cause a processor to send a message 1 transmission for a random access procedure on the first beam, where the message 1 transmission includes a PRACH preamble sequence. The processor-executable programming may be further adapted to cause a processor to open a RAR window to monitor for a message 2 transmission according to a predetermined sequence, where the predetermined sequence defines whether to monitor the first beam, the second beam, or some combination of the two beams. The processor-executable programming may be further adapted to cause a processor to receive the message 2 transmission.

According to at least one aspect of the disclosure, scheduling entities are disclosed. In at least one example, scheduling entities may include a transceiver, a memory, and a processor coupled to the transceiver and the memory. The processor may be adapted to receive via the transceiver a message 1 transmission from a scheduled entity for a random access procedure on a first beam, the message 1 transmission including a PRACH preamble sequence. The processor may further be adapted to generate a message 2 transmission for the random access procedure, the message 2 transmission including data on a physical downlink control channel (PDCCH) and a random access response (RAR) on a physical downlink shared channel (PDSCH). The processor may further be adapted to obtain a predetermined sequence for transmitting the message 2 transmission, where the predetermined sequence designates whether to send the message 2 transmission on the first beam or a second beam available for communications with the scheduled entity. The processor may further be adapted to send via the transceiver the message 2 transmission on the first beam or the second beam as designated by the predetermined sequence.

Additional aspects of the present disclosure include methods operational on a wireless communication device and/or means for performing such methods. According to at least one example, such methods may include receiving a message 1 transmission from a scheduled entity for a random access procedure on a first beam, the message 1 transmission including a PRACH preamble sequence. The PRACH preamble sequence may be detected, and a message 2 transmission for the random access procedure may be generated. The message 2 transmission may include data on a PDCCH and a RAR on a PDSCH. A predetermined sequence may be obtained for transmitting the message 2 transmission, where the predetermined sequence designates whether to send the message 2 transmission on the first beam or a second beam available for communications with the scheduled entity. Furthermore, the message 2 transmission may be sent on the first beam or the second beam as designated by the predetermined sequence.

Still further aspects of the present disclosure include processor-readable storage mediums storing processor-executable programming. In at least one example, the processor-executable programming may be adapted to cause a processor to receive a message 1 transmission from a scheduled entity for a random access procedure on a first beam, the message 1 transmission including a PRACH preamble sequence. The processor-executable programming may be further adapted to cause a processor to generate a message 2 transmission for the random access procedure, the message 2 transmission including data on a PDCCH and a RAR on a PDSCH. The processor-executable programming may be further adapted to cause a processor to obtain a predetermined sequence for transmitting the message 2 transmission, where the predetermined sequence designates whether to send the message 2 transmission on the first beam or a second beam available for communications with the scheduled entity. The processor-executable programming may be further adapted to cause a processor to send the message 2 transmission on the first beam or the second beam as designated by the predetermined sequence.

Other aspects, features, and embodiments of the present disclosure will become apparent to those of ordinary skill in the art, upon reviewing the following description of specific, exemplary embodiments of the present invention in conjunction with the accompanying figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
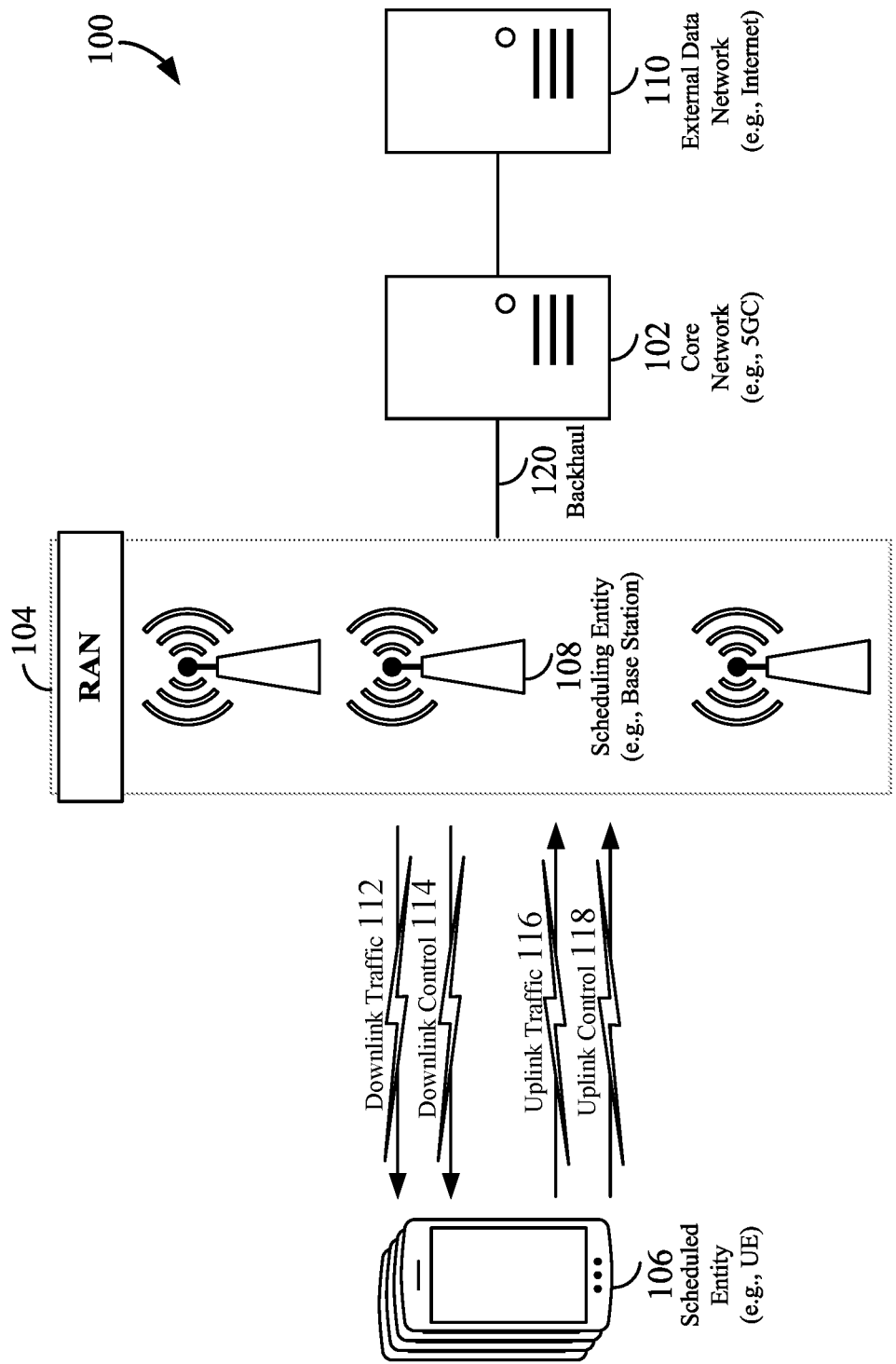
FIG. 1 is a schematic diagram illustrating an example of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
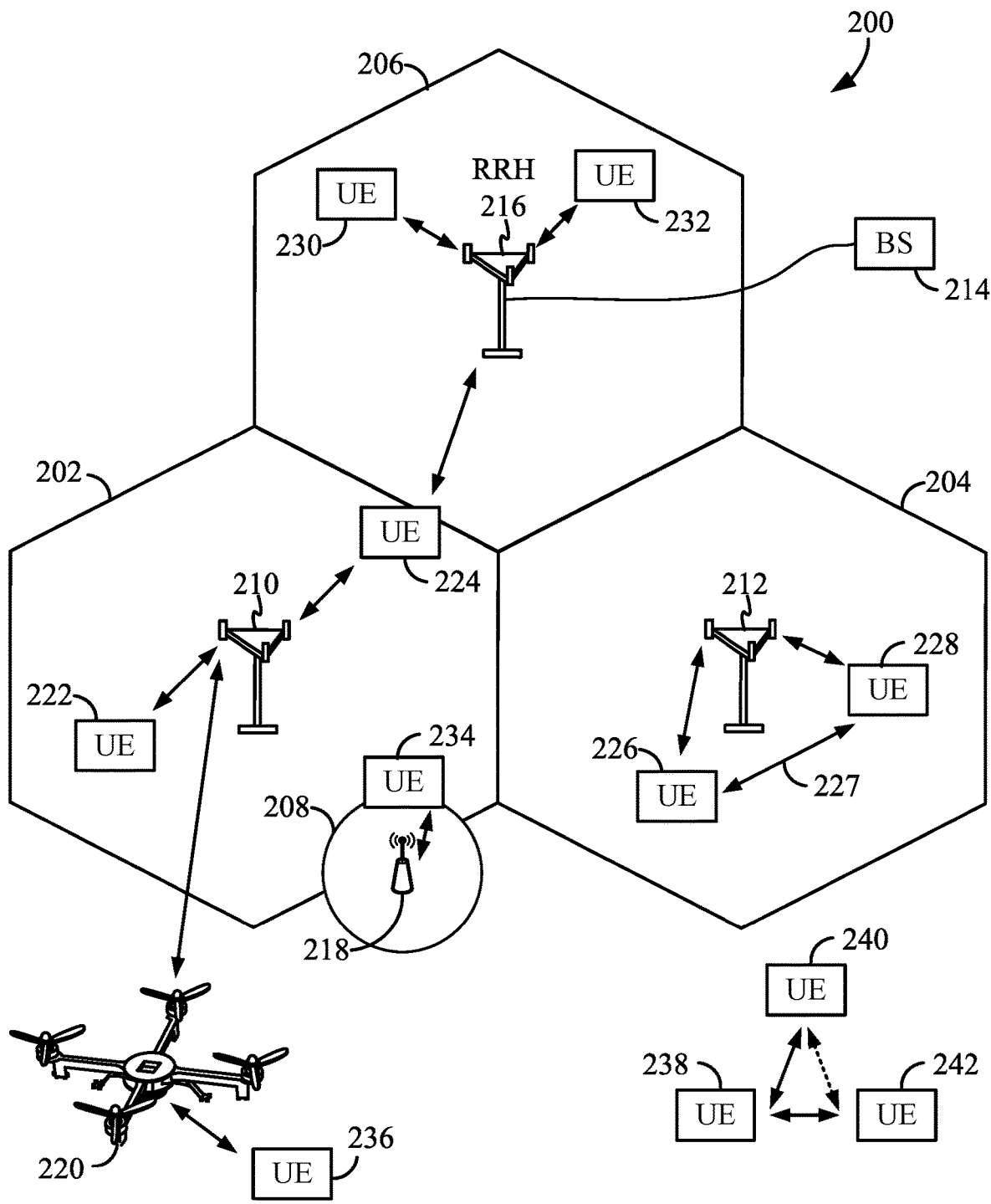
FIG. 2 is a conceptual diagram illustrating an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). Such unified synchronization signals may be referred to as a synchronization signal block (SSB). The UEs 222, 224, 226, 228, 230, and 232 may receive the SSB, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some aspects of the disclosure, the scheduling entity and/or scheduled entity may be configured for beamforming to provide a desired level of performance. One example of such a technology is multiple-input multiple-output (MIMO) technology where a transmitting device (e.g., a scheduling entity) uses multiple antennas to send beamformed signals to a receiving device (e.g., a scheduled entity) which can have one or more antennas. Here, the transmitted beamformed signals may be adjusted in phase (and, optionally, amplitude) such that the resulting signal power is focused toward the receiving device. Another example of beamforming includes millimeter wave (mmW) communications, where beamformed signals are sent and received at mmW frequencies (e.g., in the range of 30 GHz, 60 GHz, etc.).

Figure 3:
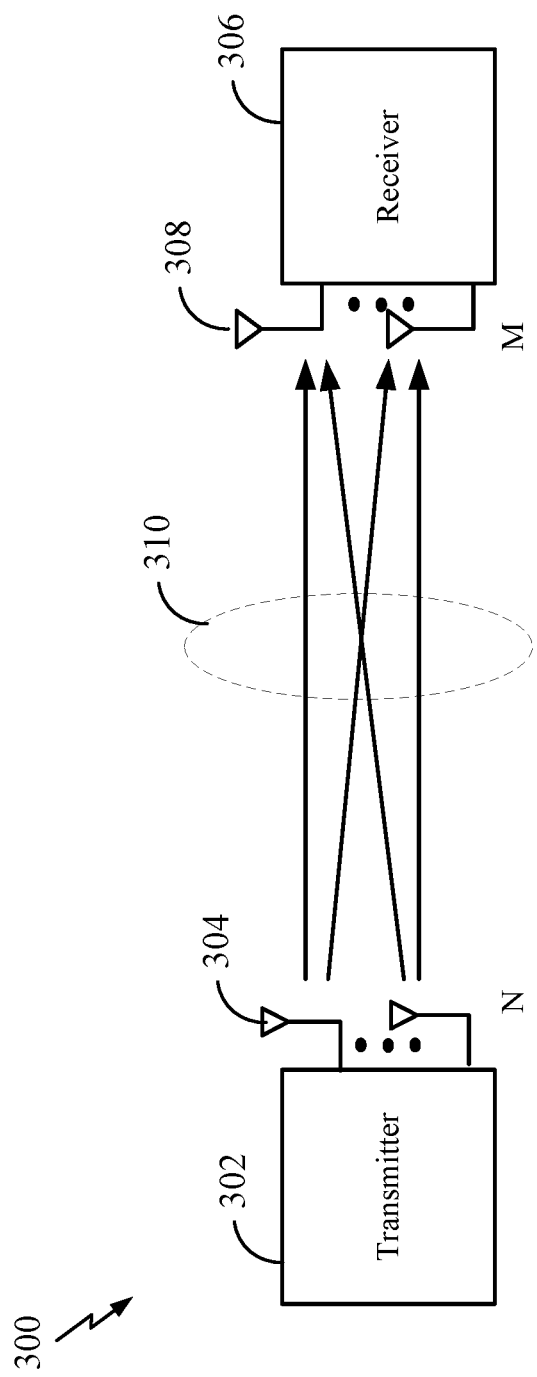
FIG. 3 is a block diagram illustrating a wireless communication system supporting multiple-input multiple-output (MIMO) communication.

FIG. 3 illustrates an example of a wireless communication system 300 supporting MIMO. As depicted, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Figure 4:
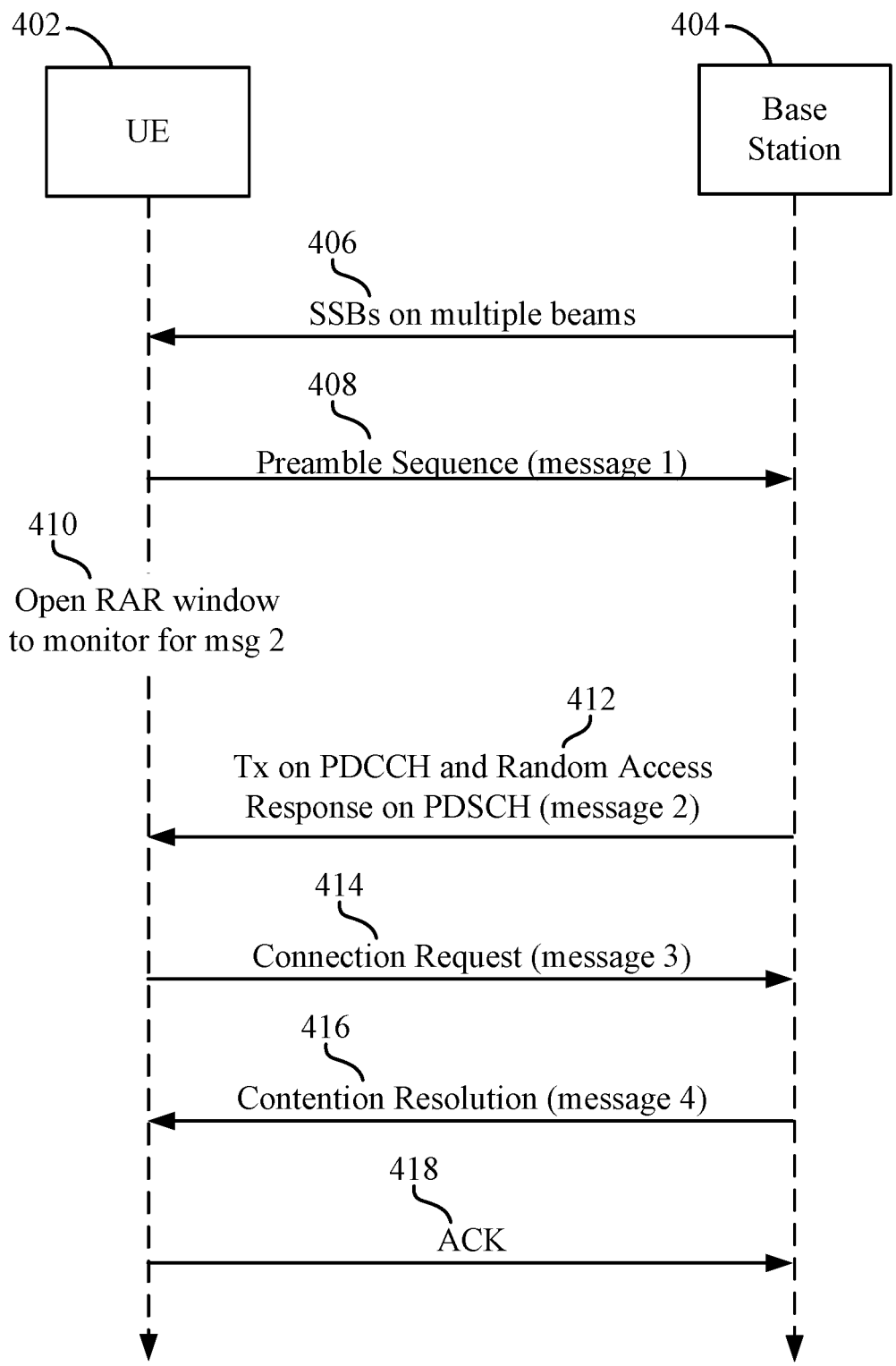
FIG. 4 is a flow diagram illustrating an example of a typical random access procedure.

As a UE operates in the wireless communication system 100, the UE may perform a random access procedure with the wireless communication system 100. A random access procedure is a contention-based channel access procedure that a connected UE may use to obtain and utilize resources for wireless communication. A random access procedure can also be triggered by a handover or initial access to the network. According to at least one embodiment of a random access procedure, a UE and a network entity (e.g., a base station) may employ a four-step communication process. FIG. 4 is a flow diagram illustrating an example of such a four-step random access procedure. In the depicted example, the UE 402 and base station 404 may employ beamforming where the various communications between the UE 402 and the base station 404 are transmitted on directional beams.

Initially, the UE 402 may monitor for SSBs 406 transmitted by the base station 404. In some examples, such as in mm wave communications, the base station 404 may transmit a sequence of SSBs, with each SSB transmitted in a different beam. The UE 402 can successfully detect an SSB, and can select the beam corresponding to the detected SSB to perform the random access procedure. The UE 402 can select a PRACH (physical random access channel) occasion and preamble sequence corresponding to the selected SSB, and can send a first message 408 on the PRACH at increasing power until the base station 404 detects the preamble.

After sending the first message 408 aligned with a particular beam, the UE 402 opens a random access response (RAR) measurement window 410 to monitor for a second message from the base station 404. The UE 402 may generally expect the second message to be Quasi-Co-Located (QCL) with respect to the initially detected SSB 406 and with the beam on which the first message 408 was transmitted by the UE 402. As a result, the UE 402 may typically be tuned to monitor for message 2 on the same beam on which the SSB 406 corresponding to the PRACH transmission for message 1 408 was sent. More specifically, the UE 402 monitors a particular PDCCH (physical downlink control channel) in a Searchspace and a corresponding CORESET (Control Resource Set). The PDCCH is specified by its periodicity and offset to determine a particular slot, and a PDCCH pattern to determine the symbol where it is present.

In response to detecting the preamble transmitted by the UE 402, the base station 404 sends the second message 412 that includes a transmission on the PDCCH and a RAR transmitted on the PDSCH (physical downlink shared channel). The base station 404 will typically transmit the second message 412 QCL with respect to the message 1 408 received from the UE 402.

In response to decoding the RAR on the PDSCH, the UE sends a third message 414 including an RRC connection request message using PUSCH and PUCCH. The base station 404 then transmits a contention resolution message 416, typically referred to as message 4, on the PDSCH. The UE 402 detects that the contention resolution message 416 was directed toward it, and sends an ACK 418 indicating contention resolution was successful.

Typically, the UE 402 operates under the assumption that all of the messages 1 through 4 will be transmitted along the same beam. That is, the UE 402 may generally expect that all messages will be transmitted in QCL relationship with each other and with the SSB from which the UE 402 used to derive its PRACH message.

In some instances, there may be more than one candidate beam available for the transmission of one or more of the messages 1 through 4. For example, schemes have been proposed whereby more than one candidate beam may be determined for use in a random access procedure. Some examples for identifying that multiple beams are available include when the UE conveys a first and second preferred SSBs via PRACH signature space partitioning, when a first beam is deduced from the RACH occasion and a second beam is determined as a fallback from an SSB corresponding to the first beam, when multiple beams correspond to different attempts for message 1 for different SSBs, or when the base station clears medium for transmissions only along certain beams and not along others. Additional and/or different schemes may be utilized to facilitate more than one beam being available for transmission of one or more messages in a random access procedure.

Regardless of the scheme implemented to facilitate multiple beam availability for random access procedures, reception of the transmitted messages may require some understanding or agreement by each device as to which beam to use and/or monitor when multiple beams are available. For example, there may be more than one candidate beam available for the base station to use for sending the message 2 in FIG. 4. The UE 402 and the base station 404 should accordingly have an understanding or agreement of the beam that will be monitored by the UE 402 so that the base station 404 can send the message 2 in a manner suitable for the beam monitored by the UE 402. Various aspects of the present disclosure include procedures for facilitating the transmission and reception of message 2, message 3, and/or message 4 of a random access procedure where more than one beam is available for transmissions between the UE and the base station.

Figure 5:
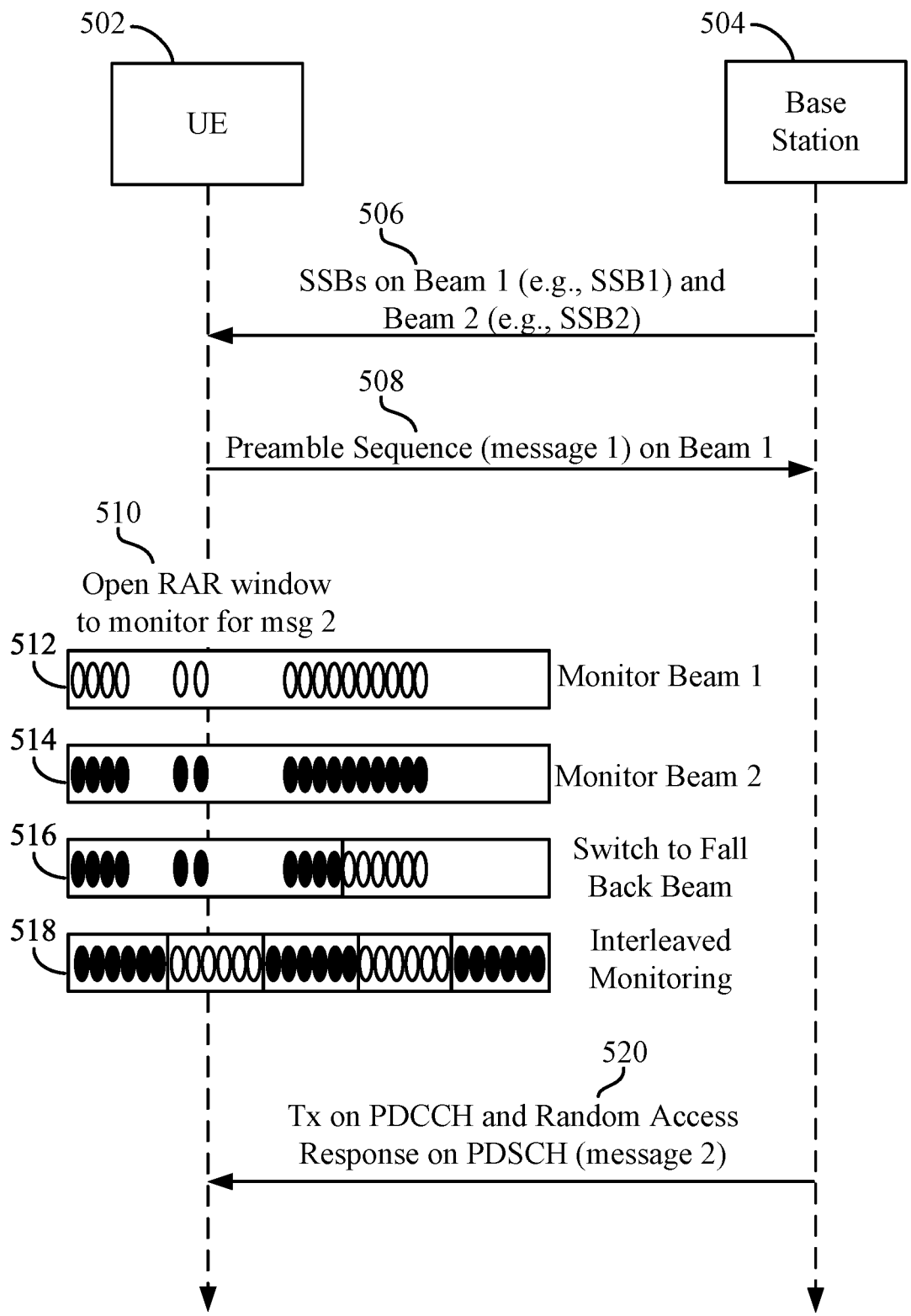
FIG. 5 is a flow diagram illustrating an example of transmission and reception of a second message (e.g. message 2) of a random access procedure according to one or more implementations.

FIG. 5 is a flow diagram illustrating an example of transmission and reception of a second message (e.g. message 2) of a random access procedure according to one or more implementations. As depicted, a UE 502 may monitor for SSBs 506 transmitted by the base station 504. The UE 502 may detect more than one SSB, such as SSB1 on a first beam and SSB2 on a second beam. Accordingly, the UE 502 may determine the first beam and the second beam are available for transmissions. In other words, the UE 502 may determine that transmissions from the UE 502 may be sent on a beam QCL with SSB1 or SSB2.

The UE 502 can select a PRACH (physical random access channel) occasion and preamble sequence corresponding to the selected SSB, and can send a first message 508 on the PRACH at increasing power until the base station 404 detects the preamble. The UE 502 may send the message 1 transmission 508 on the first beam QCL with the SSB1.

After sending the message 1 transmission 508 aligned with the first beam, the UE 502 opens a random access response (RAR) measurement window 510 to monitor for a message 2 transmission from the base station 504. According to aspects of the present disclosure, the UE 502 monitors for the message 2 transmission on the first beam, the second beam, or some combination of the first and second beams according to a predetermined sequence.

In a first example, as shown in FIG. 5, the predetermined sequence may specify monitoring 512 the same beam used to send the message 1 transmission 508. In this example, the UE 502 will monitor beam 1 that is QCL with the SSB1 for the duration of the RAR window 510, since beam 1 was the beam used by the UE 502 to send the message 1 transmission 508.

In a second example, the predetermined sequence may specify monitoring 514 the alternate beam available to the UE 502. In this example, the other beam available to the UE 502 is beam 2 that is QCL with SSB2. Accordingly, the UE 502 would monitor beam 2 for the duration of the RAR window 510.

In a third example, the predetermined sequence may specify monitoring 516 the alternate beam (e.g., beam 2) for a specified duration of the RAR window. If the message 2 transmission is not received on the alternate beam (e.g., beam 2) for the specified duration of the RAR window, then the UE 502 tunes to the beam used to send the message 1 transmission (e.g., beam 1). According to one or more examples, the specified duration may be defined as a specific amount of time after the message 1 transmission 508 is sent by the UE. In some implementations, the specified duration may be pre-provisioned, such as by being defined by the 3GPP specifications. In other implementations, the specified duration may be configured between the UE 502 and the base station 504, such as via RMSI.

In a fourth example, the predetermined sequence may specify monitoring 518 the used beam and the alternate beam in an interleaved fashion. For example, as shown in FIG. 5, the predetermined sequence may specify switching monitoring between beam 1 and beam 2. Various implementations may employ differing parameters to determine an interleaving arrangement.

In a first implementation of the fourth example, the interleaving arrangement may be determined by splitting or partitioning the slots within the RAR window to different beams according to their periodicity and offset pairs. For instance, the monitored PDCCHs for beam 1 and beam 2 may be assigned to different slots within the RAR window, where slots for different beams are identified by configuring different periodicity and offset pairs for the given searchspace and CORESET. In other words, the UE 502 and the base station 504 may know that beam 1 will utilize a first set of periodicity and offset pairs in the RAR window and beam 2 will utilize a second set of periodicity and offset pairs in the RAR window. As a result, both the UE 502 and the base station 504 will understand that message 2 will be transmitted on either beam 1 or beam 2 depending on the periodicity and offset pair utilized to send the message 2 transmission.

In a second implementation of the fourth example, the interleaving arrangement may be determined by splitting or partitioning the slots within the RAR window to the different beams according to their relative offset. For instance, the monitored PDCCHs for beam 1 and beam 2 may be assigned to different slots within the RAR window, where the slots for the different beams are identified by their relative offset from the beginning of the RAR window. That is, the offset may be determined relative to the start of the RAR window. Typically, the RAR window starts at a specified time after the message 1 transmission 508 is sent by the UE 502. Accordingly, both the UE 502 and the base station 504 have knowledge of when the RAR window has started, and both entities will understand that message 2 will be transmitted on either beam 1 or beam 2 depending on the slot utilized to send the message 2 transmission relative to the start of the RAR window.

In a third implementation of the fourth example, beam 1 and beam 2 may correspond to two different PRACH transmissions. For example, if two message 1 transmissions 508 are sent on separate RACH occasions respective to beam 1 and beam 2, each respective RACH occasion may prescribe a respective RAR window starting position. For instance, a respective RAR window may begin at time T1 for beam 1 and another respective RAR window may begin at time T2 for beam 2. In such an example, interleaved monitoring may only occur in the slots that are common to both RAR windows. That is, the interleaved monitoring may occur during slots where the RAR windows overlap each other. The portions of the RAR windows that do not overlap will include monitoring of just the beam associated with the open RAR window. According to various examples, the interleaved monitoring during the slots common to both RAR windows may be carried out according to either the first implementation or the second implementation of the fourth example, described above.

In response to detecting the preamble transmitted by the UE 502, the base station 504 sends the message 2 transmission 520 that includes a transmission on the PDCCH (physical downlink control channel) and a RAR transmitted on the PDSCH (physical downlink shared channel). The base station 504 will have the same understanding as the UE 502 as to which beam is being monitored by the UE 502 at each particular time of the RAR window. As a result, the base station 504 sends the message 2 transmission 520 QCL with respect to the beam that the UE 502 will be monitoring at the time the message 2 transmission 520 is sent, as described with relation to examples 1 through 4 above.

According to various examples, the message 3 transmission and the message 4 transmission (not shown in FIG. 5) may be sent and received on beams implied by the exchange of the message 2 transmission. For example, if the UE receives the message 2 transmission on beam 2, then the UE and base station will both understand that the message 3 transmission and the message 4 transmission will be exchanged on beam 2. Similarly, if the UE receives the message 2 transmission on beam 1, then the UE and base station will both understand that the message 3 transmission and the message 4 transmission will be exchanged on beam 1.

In other examples, the message 3 and message 4 transmissions may be exchanged on beams specified. For instance, the message 2 transmission may include an indication of which beam will be utilized for exchanging the message 3 transmission and message 4 transmission.

Figure 6:
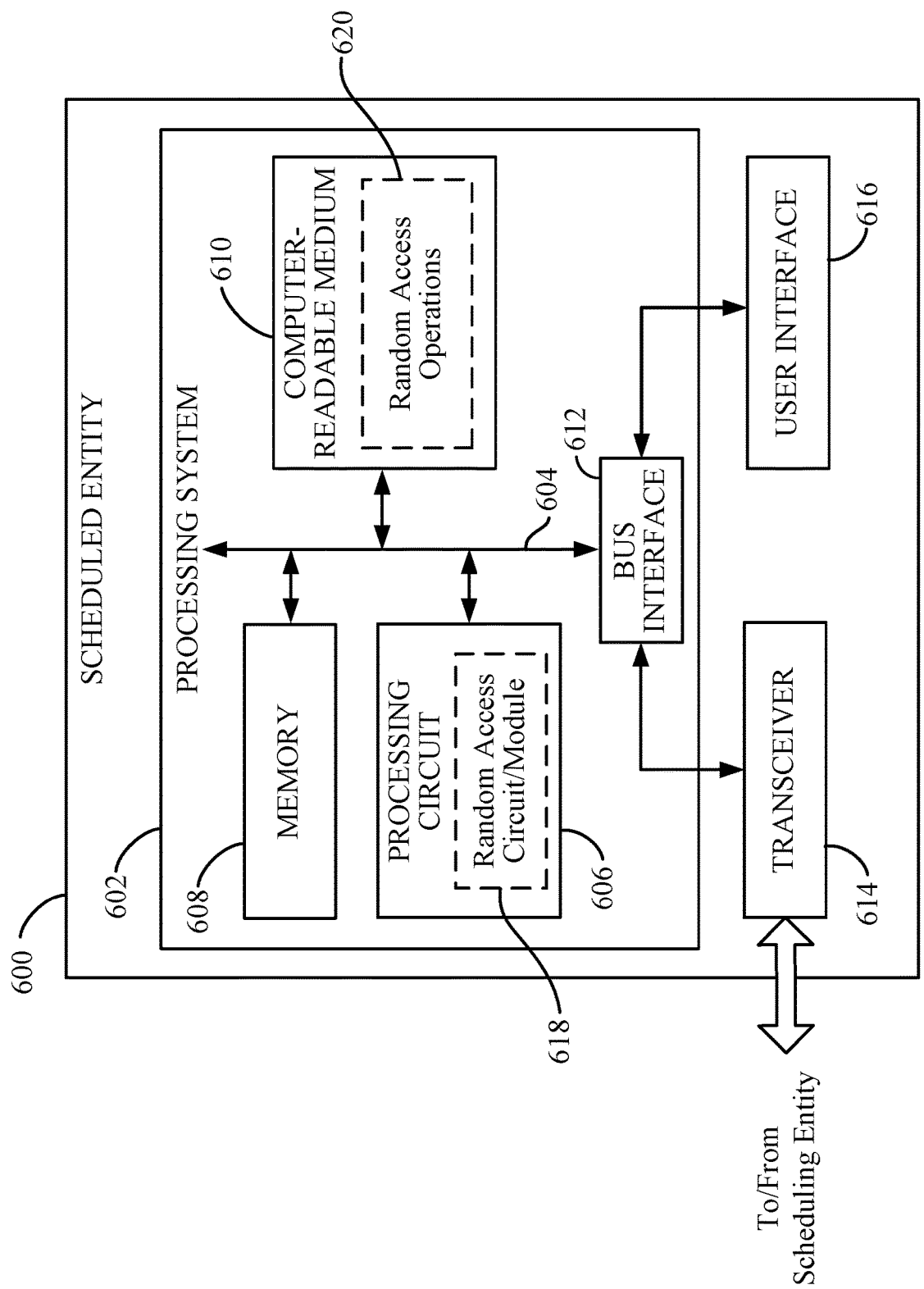
FIG. 6 is a block diagram illustrating select components of a scheduled entity employing a processing system according to at least one example of the present disclosure.

FIG. 6 is a block diagram illustrating select components of a scheduled entity 600 employing a processing system 602 according to at least one example of the present disclosure. In this example, the processing system 602 is implemented with a bus architecture, represented generally by the bus 604. The bus 604 may include any number of interconnecting buses and bridges depending on the specific application of the processing system 602 and the overall design constraints. The bus 604 communicatively couples together various circuits including one or more processors (represented generally by the processing circuit 606), a memory 608, and computer-readable media (represented generally by the storage medium 610). The bus 604 may also link various other circuits such as timing sources, peripherals, voltage regulators, and power management circuits, which are well known in the art, and therefore, will not be described any further. A bus interface 612 provides an interface between the bus 604 and a transceiver 614. The transceiver 614 provides a means for communicating with various other apparatus over a transmission medium. Depending upon the nature of the apparatus, a user interface 616 (e.g., keypad, display, speaker, microphone, joystick) may also be provided.

The processing circuit 606 is responsible for managing the bus 604 and general processing, including the execution of programming stored on the computer-readable storage medium 610. The programming, when executed by the processing circuit 606, causes the processing system 602 to perform the various functions described below for any particular apparatus. The computer-readable storage medium 610 and the memory 608 may also be used for storing data that is manipulated by the processing circuit 606 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 606 is arranged to obtain, process and/or send data, control data access and storage, issue commands, and control other desired operations. The processing circuit 606 may include circuitry adapted to implement desired programming provided by appropriate media, and/or circuitry adapted to perform one or more functions described in this disclosure. For example, the processing circuit 606 may be implemented as one or more processors, one or more controllers, and/or other structure configured to execute executable programming and/or execute specific functions. Examples of the processing circuit 606 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 606 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 606 are for illustration and other suitable configurations within the scope of the present disclosure are also contemplated.

In some instances, the processing circuit 606 may include a random access circuit and/or module 618. The random access circuit/module 618 may generally include circuitry and/or programming (e.g., programming stored on the storage medium 610) adapted to conduct a random access procedure according to one or more aspects of the present disclosure. As used herein, reference to circuitry and/or programming may be generally referred to as logic (e.g., logic gates and/or data structure logic).

The storage medium 610 may represent one or more computer-readable devices for storing programming, such as processor executable code or instructions (e.g., software, firmware), electronic data, databases, or other digital information. The storage medium 610 may also be used for storing data that is manipulated by the processing circuit 606 when executing programming. The storage medium 610 may be any available non-transitory media that can be accessed by a general purpose or special purpose processor, including portable or fixed storage devices, optical storage devices, and various other mediums capable of storing, containing and/or carrying programming. By way of example and not limitation, the storage medium 610 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 610 may be coupled to the processing circuit 606 such that the processing circuit 606 can read information from, and write information to, the storage medium 610. That is, the storage medium 610 can be coupled to the processing circuit 606 so that the storage medium 610 is at least accessible by the processing circuit 606, including examples where the storage medium 610 is integral to the processing circuit 606 and/or examples where the storage medium 610 is separate from the processing circuit 606 (e.g., resident in the processing system 602, external to the processing system 602, distributed across multiple entities).

Programming stored by the storage medium 610, when executed by the processing circuit 606, can cause the processing circuit 606 to perform one or more of the various functions and/or process steps described herein. In at least some examples, the storage medium 610 may include random access operations 620. The random access operations 620 are generally adapted to cause the processing circuit 606 to conduct a random access procedure according to one or more aspects of the present disclosure. Thus, according to one or more aspects of the present disclosure, the processing circuit 606 is adapted to perform (independently or in conjunction with the storage medium 610) any or all of the processes, functions, steps and/or routines for any or all of the scheduled entities described herein (e.g., scheduled entity 106 and 600, UE 222, 224, 226, 228, 230, 232, 234, 236, 238, 240, 242, 402, and 502, transmitter 302, receiver 306). As used herein, the term "adapted" in relation to the processing circuit 606 may refer to the processing circuit 606 being one or more of configured, employed, implemented, and/or programmed (in conjunction with the storage medium 610) to perform a particular process, function, step and/or routine according to various features described herein.

Figure 7:
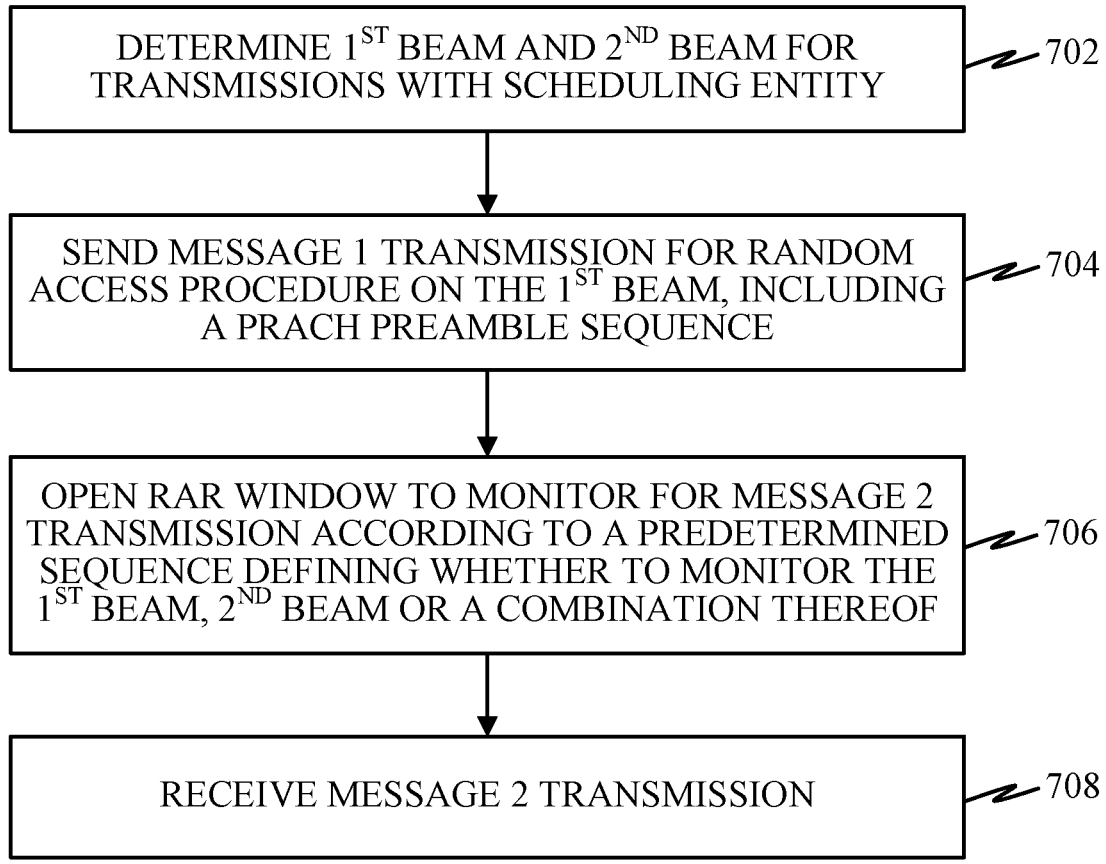
FIG. 7 is a flow diagram illustrating at least one example of a method operational on a scheduled entity.

FIG. 7 is a flow diagram illustrating at least one example of a method operational on a scheduled entity, such as scheduled entity 600. With reference to FIGS. 6 and 7, the scheduled entity 600 may determine a first beam and a second beam available for transmissions between the scheduled entity and a scheduling entity at 702. For example, the scheduled entity 600 may include logic (e.g., random access circuit/module 618 and/or random access operations 620) to determine a first beam and a second beam available for transmissions between the scheduled entity 600 and a scheduling entity. In at least one example, the scheduled entity 600 may include logic (e.g., random access circuit/module 618 and/or random access operations 620) to monitor SSBs transmitted by the scheduling entity, and may determine a first beam and a second beam for communications with the scheduling entity. That is, the scheduled entity 600 may determine a first beam QCL with SSB1 and a second beam QCL with SSB2.

At 704, the scheduled entity 600 may send a message 1 transmission for a random access procedure on the first beam. For example, the scheduled entity 600 may include logic (e.g., random access circuit/module 618 and/or random access operations 620) to send via the transceiver 614 a message 1 transmission including a PRACH preamble sequence on the first beam (e.g., the beam QCL with a received SSB1). In at least one implementation, a message 1 transmission may be sent on separate respective RACH occasions for the first beam and the second beam.

At 706, the scheduled entity 600 may open a RAR window to monitor for a message 2 transmission according to a predetermined sequence. The predetermined sequence may define whether to monitor the first beam, the second beam, or some combination of the first and second beams. For example, the scheduled entity 600 may include logic (e.g., random access circuit/module 618 and/or random access operations 620) to open a RAR window to monitor for the message 2 transmission according to the predetermined sequence, such as one of the examples described above with reference to FIG. 5.

In at least one implementation, the scheduled entity 600 may include logic (e.g., random access circuit/module 618 and/or random access operations 620) to monitor for the message 2 transmission according to the predetermined sequence, where the predetermined sequence indicates to monitor the first beam that was used to send the message 1 transmission.

In another implementation, the scheduled entity 600 may include logic (e.g., random access circuit/module 618 and/or random access operations 620) to monitor for the message 2 transmission according to the predetermined sequence, where the predetermined sequence indicates to monitor the second beam.

In yet another implementation, the scheduled entity 600 may include logic (e.g., random access circuit/module 618 and/or random access operations 620) to monitor for the message 2 transmission according to the predetermined sequence, where the predetermined sequence indicates to monitor the second beam for a predefined duration of the RAR window. The scheduled entity 600 may further include logic (e.g., random access circuit/module 618 and/or random access operations 620) to tune to the first beam after the predefined duration of the RAR window has expired without receiving the message 2 transmission, and monitor the first beam for the remainder of the RAR window.

In still another implementation, the scheduled entity 600 may include logic (e.g., random access circuit/module 618 and/or random access operations 620) to monitor for the message 2 transmission according to the predetermined sequence, where the predetermined sequence indicates to monitor the first beam and the second beam according to an interleaving arrangement. In one example, such an interleaving arrangement may include partitioning slots within the RAR window between the first beam and the second beam according to predefined periodicity and offset pairs for a particular searchspace and CORESET. In another example, such an interleaving arrangement may include partitioning slots within the RAR window between the first beam and the second beam according to an offset relative to a beginning of the RAR window. In a further example when a message 1 transmission is sent on respective RACH occasions corresponding to the first beam and the second beam and each respective RACH occasion accordingly prescribes a respective RAR window starting position, such an interleaving arrangement may include interleaved monitoring for slots that are common to both a first RAR window and a second RAR window, as described herein with reference to FIG. 5.

At 708, the scheduled entity 600 may receive the message 2 transmission on the beam monitored according to the predetermined sequence. For example, the scheduled entity 600 may include logic (e.g., random access circuit/module 618 and/or random access operations 620) to receive the message 2 transmission via the transceiver 614.

In some implementations, the scheduled entity may further send a message 3 transmission and receive a message 4 transmission on beams indicated by the message 2 transmission. For example, the scheduled entity 600 may receive an indication with the message 2 transmission identifying which beam to utilize for sending the message 3 transmission. In other examples, the scheduled entity 600 may be configured send the message 3 transmission utilizing the same beam on which the message 2 transmission was received.

Figure 8:
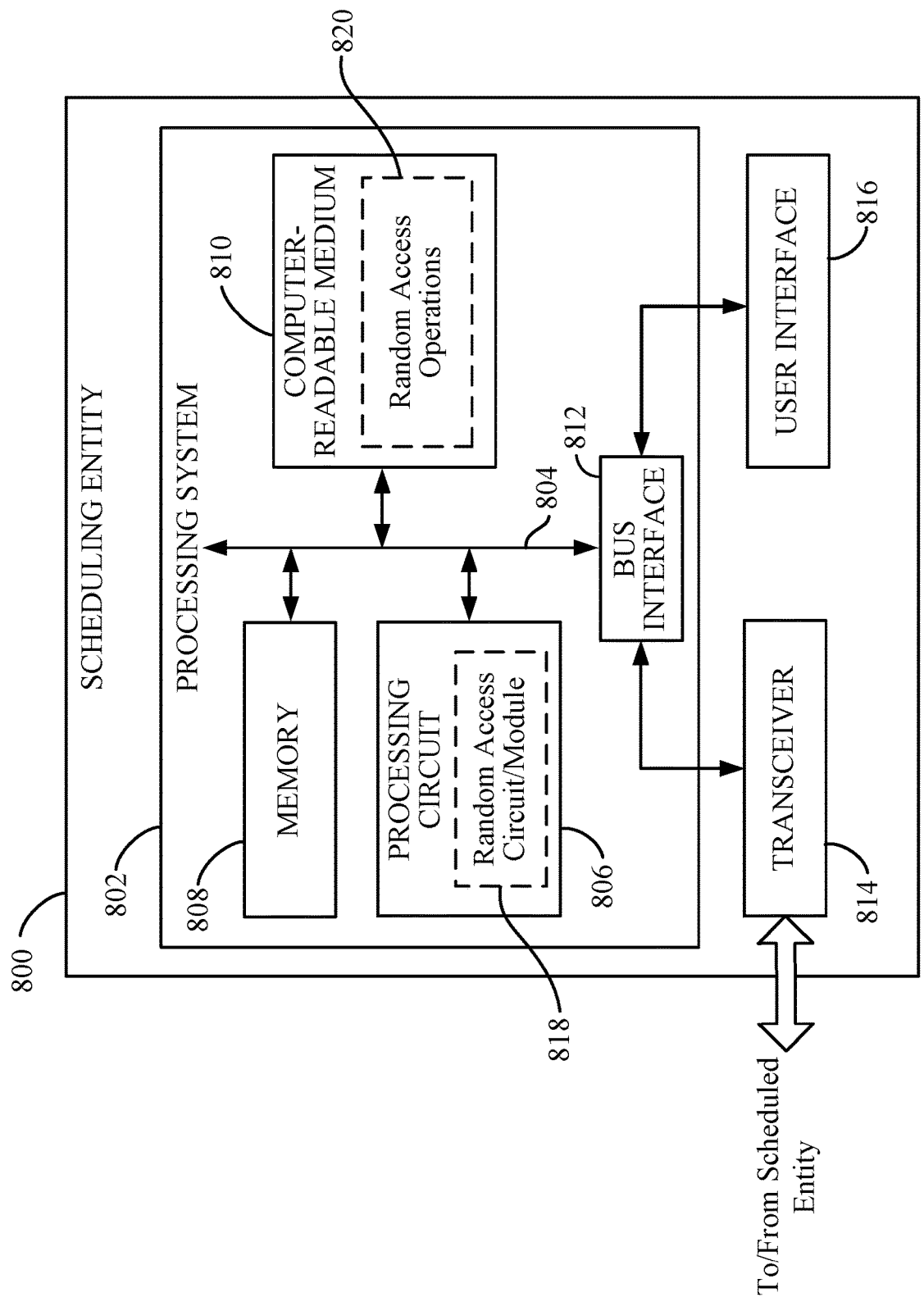
FIG. 8 is a block diagram illustrating select components of a scheduling entity employing a processing system according to at least one example of the present disclosure.

Turning now to FIG. 8, a block diagram is shown illustrating select components of a scheduling entity 800 employing a processing system 802 according to at least one example of the present disclosure. Similar to the processing system 602 in FIG. 6, the processing system 802 may be implemented with a bus architecture, represented generally by the bus 804. The bus 804 may include any number of interconnecting buses and bridges depending on the specific application of the processing system 802 and the overall design constraints. The bus 804 communicatively couples together various circuits including one or more processors (represented generally by the processing circuit 806), a memory 808, and computer-readable media (represented generally by the storage medium 810). The bus 804 may also link various other circuits such as timing sources, peripherals, voltage regulators, and power management circuits, which are well known in the art, and therefore, will not be described any further. A bus interface 812 provides an interface between the bus 804 and a transceiver 814. The transceiver 814 provides a means for communicating with various other apparatus over a transmission medium. Depending upon the nature of the apparatus, a user interface 816 (e.g., keypad, display, speaker, microphone, joystick) may also be provided.

The processing circuit 806 is responsible for managing the bus 804 and general processing, including the execution of programming stored on the computer-readable storage medium 810. The programming, when executed by the processing circuit 806, causes the processing system 802 to perform the various functions described below for any particular apparatus. The computer-readable storage medium 810 and the memory 808 may also be used for storing data that is manipulated by the processing circuit 806 when executing programming.

The processing circuit 806 is arranged to obtain, process and/or send data, control data access and storage, issue commands, and control other desired operations. The processing circuit 806 may include circuitry adapted to implement desired programming provided by appropriate media in at least one example, and/or circuitry adapted to perform one or more functions described in this disclosure. The processing circuit 806 may be implemented and/or configured according to any of the examples of the processing circuit 606 described above.

In some instances, the processing circuit 806 may include a random access circuit and/or module 818. The random access circuit/module 818 may generally include circuitry and/or programming (e.g., programming stored on the storage medium 810) adapted to conduct a random access procedure with a scheduled entity according to one or more aspects described in more detail herein. As noted previously, reference to circuitry and/or programming may be generally referred to as logic (e.g., logic gates and/or data structure logic).

The storage medium 810 may represent one or more computer-readable devices for storing programming, such as processor executable code or instructions (e.g., software, firmware), electronic data, databases, or other digital information. The storage medium 810 may be configured and/or implemented in a manner similar to the storage medium 610 described above.

Programming stored by the storage medium 810, when executed by the processing circuit 806, can cause the processing circuit 806 to perform one or more of the various functions and/or process steps described herein. In at least some examples, the storage medium 810 may include random access operations 820 adapted to cause the processing circuit 806 to conduct a random access procedure with a scheduled entity according to one or more aspects described in more detail herein. Thus, according to one or more aspects of the present disclosure, the processing circuit 806 is adapted to perform (independently or in conjunction with the storage medium 810) any or all of the processes, functions, steps and/or routines for any or all of the scheduling entities described herein (e.g., scheduling entity 108, 800, base station 210, 212, 214, 218, UE 238, 404, 504, quadcopter 220, transmitter 302, receiver 306). As used herein, the term "adapted" in relation to the processing circuit 806 may refer to the processing circuit 806 being one or more of configured, employed, implemented, and/or programmed (in conjunction with the storage medium 810) to perform a particular process, function, step and/or routine according to various features described herein.

Figure 9:
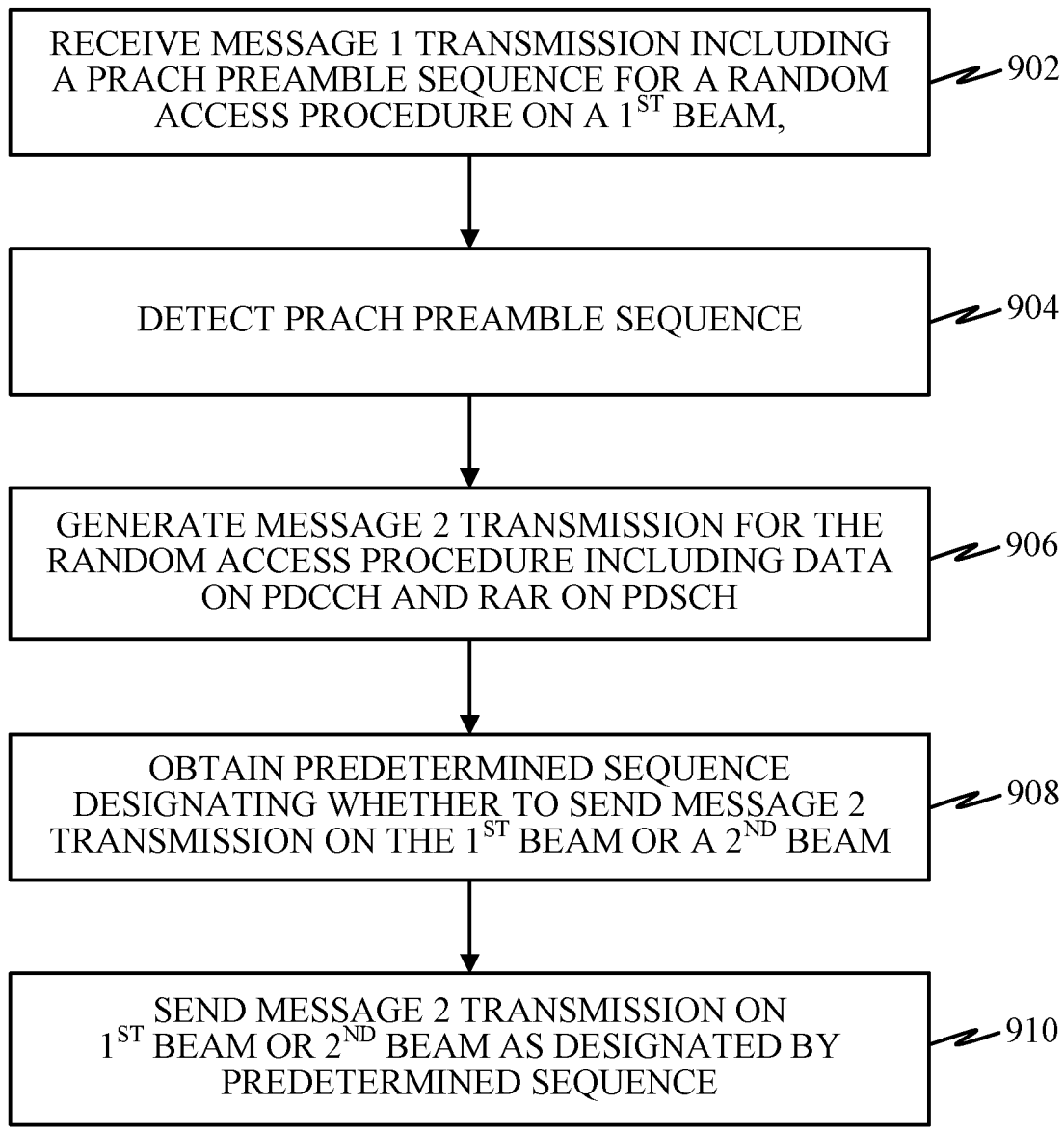
FIG. 9 is a flow diagram illustrating at least one example of a method operational on a scheduling entity.

FIG. 9 is a flow diagram illustrating at least one example of a method operational on a scheduling entity, such as scheduling entity 800. With reference to FIGS. 8 and 9, the scheduling entity 800 may receive a message 1 transmission on a first beam at 902. The message 1 transmission may include a PRACH preamble sequence for a random access procedure. For example, the scheduling entity 800 may include logic (e.g., random access circuit/module 818 and/or random access operations 820) to receive the message 1 transmission on the first beam via the transceiver 814.

At 904, the scheduling entity 800 may detect the PRACH preamble sequence. In response to detecting the PRACH preamble sequence in the message 1 transmission, the scheduling entity 800 may generate a message 2 transmission for the random access procedure at 906. For example, the scheduling entity 800 may include logic (e.g., random access circuit/module 818 and/or random access operations 820) to generate the message 2 transmission including data on the PDCCH and a RAR on the PDSCH.

At 908, the scheduling entity 800 may obtain a predetermined sequence designating whether to send the message 2 transmission on the first beam or a second beam available for communications with the scheduled entity. For example, the scheduling entity 800 may include logic (e.g., random access circuit/module 818 and/or random access operations 820) to obtain the predetermined sequence designating either the first beam or the second beam for the message 2 transmission. In some implementations, the predetermined sequence may be pre-provisioned on the scheduling entity 800, and obtained from such pre-provisioned information.

In at least one implementation, the predetermined sequence may designate sending the message 2 transmission utilizing the first beam on which the message 1 transmission was received. In another implementation, the predetermined sequence may designate sending the message 2 transmission utilizing the second beam. In yet another implementation, the predetermined sequence may designate sending the message 2 transmission utilizing the second beam when sent within a predefined duration of time from a beginning of the RAR window, and utilizing the first beam when sending the message 2 transmission after the predefined duration of the RAR window has expired. In still another implementation, the predetermined sequence may designate sending the message 2 transmission utilizing the first beam or the second beam according to an interleaving arrangement. In one example, such an interleaving arrangement may designate partitioning slots within the RAR window between the first beam and the second beam according to predefined periodicity and offset pairs for a particular searchspace and CORESET. In another example, such an interleaving arrangement may designate partitioning slots within the RAR window between the first beam and the second beam according to an offset relative to a beginning of the RAR window.

At 910, the scheduling entity 800 may send the message 2 transmission on the first beam or the second beam as designated by the predetermined sequence. For example, the scheduling entity 800 may include logic (e.g., random access circuit/module 818 and/or random access operations 820) to send the message 2 transmission via the transceiver 814 on one of the first beam or the second beam according to the beam designated by the predetermined sequence.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 3, 6, and/or 8 may be configured to perform or employ one or more of the methods, features, parameters, and/or steps described herein with reference to FIGS. 4, 5, 7, and/or 9. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A network entity, comprising:
   at least one transceiver;
   at least one memory; and
   at least one processor coupled to the at least one transceiver and the at least one memory, wherein the network entity is configured to:
   send a first transmission for a random access procedure on a first directional beam, the first transmission comprising a physical random access channel (PRACH) preamble sequence;
   monitor for a second transmission for the random access procedure in response to the first transmission, wherein the network entity is configured to monitor for the second transmission via the first directional beam and a second directional beam, according to a beam monitoring timing sequence; and
   receive the second transmission.

2. The network entity of claim 1, wherein the beam monitoring timing sequence comprises a first duration for monitoring for the second transmission via the second directional beam, and a second duration for monitoring for the second transmission via the first directional beam after the first duration has expired without receiving the second transmission via the second directional beam.

3. The network entity of claim 1, wherein the beam monitoring timing sequence comprises an interleaving arrangement for the first directional beam and the second directional beam for monitoring for the second transmission.

4. The network entity of claim 3, wherein the interleaving arrangement is based on an interleaving of slots between the first directional beam and the second directional beam, the interleaving of slots being based on predefined slot periodicity and slot offset pairs for a particular searchspace and Control Resource Set (CORESET).

5. The network entity of claim 3, wherein the interleaving arrangement is based on an interleaving of slots between the first directional beam and the second directional beam, the interleaving of slots being based on a slot offset relative to a beginning of the beam monitoring timing sequence.

6. The network entity of claim 3, wherein the beam monitoring timing sequence comprises a first monitoring window associated with the first directional beam and a second monitoring window associated with the second directional beam; and wherein the interleaving arrangement comprises an interleaving of slots that are common to both the first monitoring window and the second monitoring window.

7. A method performed by a network entity, comprising:
   sending a first transmission for a random access procedure on a first directional beam, the first transmission comprising a physical random access channel (PRACH) preamble sequence;
   monitoring for a second transmission for the random access procedure in response to the first transmission, wherein the monitoring for the second transmission is via the first directional beam and a second directional beam, according to a beam monitoring timing sequence; and
   receiving the second transmission.

8. The method of claim 7, wherein the beam monitoring timing sequence comprises a first duration for monitoring for the second transmission via the second directional beam, and a second duration for monitoring for the second transmission via the first directional beam after the first duration has expired without receiving the second transmission via the second directional beam.

9. The method of claim 7, wherein the beam monitoring timing sequence comprises an interleaving arrangement for the first directional beam and the second directional beam for monitoring for the second transmission.

10. The method of claim 9, wherein the interleaving arrangement is based on an interleaving of slots between the first directional beam and the second directional beam, the interleaving of slots being based on predefined slot periodicity and slot offset pairs for a particular searchspace and Control Resource Set (CORESET).

11. The method of claim 9, wherein the interleaving arrangement is based on an interleaving of slots between the first directional beam and the second directional beam, the interleaving of slots being based on a slot offset relative to a beginning of the beam monitoring timing sequence.

12. The method of claim 9, wherein the beam monitoring timing sequence comprises a first monitoring window associated with the first directional beam and a second monitoring window associated with the second directional beam; and wherein the interleaving arrangement comprises an interleaving of slots that are common to both the first monitoring window and the second monitoring window.

13. A network entity, comprising:
at least one transceiver;
at least one memory; and
at least one processor coupled to the at least one transceiver and the at least one memory, wherein the network entity is configured to:
   receive a first transmission from a user equipment (UE) for a random access procedure on a first directional beam, the first transmission comprising a physical random access channel (PRACH) preamble sequence; and
   transmit a second transmission for the random access procedure in response to the first transmission, the second transmission including data on a physical downlink control channel (PDCCH) and a random access response (RAR) on a physical downlink shared channel (PDSCH),
   wherein the second transmission is transmitted via the first directional beam and a second directional beam, according to a beam monitoring timing sequence.

14. The network entity of claim 13, wherein the beam monitoring timing sequence comprises a first duration for transmitting the second transmission via the second directional beam, and a second duration for transmitting the second transmission via the first directional beam after the first duration has expired.

15. The network entity of claim 13, wherein the beam monitoring timing sequence comprises an interleaving arrangement for the first directional beam and the second directional beam for transmitting the second transmission.

16. The network entity of claim 15, wherein the interleaving arrangement is based on an interleaving of slots between the first directional beam and the second directional beam, the interleaving of slots being based on predefined slot periodicity and slot offset pairs for a particular searchspace and Control Resource Set (CORESET).

17. The network entity of claim 15, wherein the interleaving arrangement is based on an interleaving of slots between the first directional beam and the second directional beam, the interleaving of slots being based on a slot offset relative to a beginning of the beam monitoring timing sequence.

18. A method performed by a network entity, comprising:
receiving a first transmission from a user equipment (UE) for a random access procedure on a first directional beam, the first transmission comprising a physical random access channel (PRACH) preamble sequence; and transmitting a second transmission for the random access procedure in response to the first transmission, the second transmission including data on a physical downlink control channel (PDCCH) and a random access response (RAR) on a physical downlink shared channel (PDSCH), wherein the transmitting the second transmission is via the first directional beam and a second directional beam, according to a beam monitoring timing sequence.

19. The method of claim 18, wherein the beam monitoring timing sequence comprises a first duration for transmitting the second transmission via the second directional beam, and a second duration for transmitting the second transmission via the first directional beam after the first duration has expired.

20. The method of claim 18, wherein the beam monitoring timing sequence comprises an interleaving arrangement for the first directional beam and the second directional beam for transmitting the second transmission.

21. The method of claim 20, wherein the interleaving arrangement designates partitioning slots between the first directional beam and the second directional beam according to predefined periodicity and offset pairs for a particular searchspace and Control Resource Set (CORESET).

22. The method of claim 20, wherein the interleaving arrangement is based on an interleaving of slots between the first directional beam and the second directional beam, the interleaving of slots being based on a slot offset relative to a beginning of the beam monitoring timing sequence.

* * * * *